United States Patent
Huhn et al.

[15] 3,692,748
[45] Sept. 19, 1972

[54] SHRINKABLE FILM-FORMING COPOLYAMIDES PREPARED BY COPOLYMERIZING W-AMINOUNDECANOIC ACID AND THE SALT OF A DICARBOXYLIC ACID AND TRIMETHYLHEXAMETHYLENE DIAMINE

[72] Inventors: Helmut Huhn; Lutz Hoppe, both of Walsrode, Germany

[73] Assignee: Wolff & Co., Aktiengesellschaft, Walsrode, Germany

[22] Filed: Nov. 9, 1970

[21] Appl. No.: 88,123

[30] Foreign Application Priolty Data

May 14, 1968  Germany.........P 17 70 406.2

[52] U.S. Cl. ............260/78 A, 161/227, 260/30.8 R, 264/141
[51] Int. Cl. .............................................C08g 20/04
[58] Field of Search.....................................260/78 A

[56] References Cited

UNITED STATES PATENTS

| 3,150,117 | 9/1964 | Gabler.........................260/78 |
| 3,294,759 | 12/1966 | Gabler.........................260/78 |
| 3,294,758 | 12/1966 | Gabler.........................260/78 |

FOREIGN PATENTS OR APPLICATIONS

| 659,054 | 5/1965 | Belgium |
| 6,603,403 | 9/1966 | Netherlands |

OTHER PUBLICATIONS

Chem. Abstracts, Vol. 65, 1966, 7045e–f, Schmitt.

Primary Examiner—Howard E. Schain
Attorney—Plumley & Tyner

[57] ABSTRACT

Shrinkable film-forming copolyamides which are glass-clear in appearance and which are obtained by polycondensation of 65 – 85 percent by weight of ω-amino-undecanoic acid and 35 – 15 percent by weight of a salt of a dicarboxylic acid and a diamine, between 50 and 100 mol % of the diamine being trimethylhexamethylene diamine, and films produced therefrom.

6 Claims, No Drawings

SHRINKABLE FILM-FORMING COPOLYAMIDES PREPARED BY COPOLYMERIZING W-AMINOUNDECANOIC ACID AND THE SALT OF A DICARBOXYLIC ACID AND TRIMETHYLHEXAMETHYLENE DIAMINE

This invention relates to shrinkable film-forming copolyamides which are glass-clear in appearance, and to a process for their production.

In addition to the known production of clear polyamides from terephthalic acid and trimethyl hexamethylene dia-mine (U.S. Pat. specification, No. 3,150,117), it is also known that two or more starting monomers can be polycondensed to form copolyamides. For example, adipic acid and terephthalic acid can be polycondensed with isophorone diamine (see Chemische Industrie 4, 7 (1966)). Another process for the production of transparent copoly-amides is known from DAS 1,265,412 according to which mixture consisting of a dicarboxylic acid, 3-amino-methyl-3,5,5-trimethyl cyclohexylamine and amino caproic acid and/or 11-amino-undecanoic acid of their lactams is polycondensed.

Unfortunately, all the aforementioned polyamides and co-polyamides are either totally unshrinkable or can only be shrunk at elevated temperatures. In some cases, considerable shrinkage stressed occur at temperatures as low as 20° to 50° C. Shrink films produced from copolyamides of their kind are unsuitable for the shrink-wrapping of products that are particularly sensitive to temperature. In addition, expensive plant, for example in the form of shrinkable tunnels producing air heated to at least 150° C are required to initiate the shrinkage process.

It is an object of this invention to provide a shrinkable film-forming clear copolyamide whose shrinkage and stressing on shrinkage are substantially nil up to a temperature of 40° C and which, at a temperature of 75° C for example, has a high shrinkage capacity hitherto unattained with conventional polyamides and copolyamides despite the fact that it only undergoes average stressing on shrinkage.

This object is accomplished by a shrinkable film-forming transparent copolyamide consisting essentially of 65–85 percent by weight of recurring structural units of the formula $\mathrm{+NH-(CH_2)_{10}-CO+}$ and 35–15 percent by weight of recurring structural units of the general formula $\mathrm{+OC-Y-CO-NH-R-NH+}$ wherein Y is

or $-(CH_2)_n-$ and
R is a member selected from the group consisting of
a) a mixture in any proportions of the two isomers

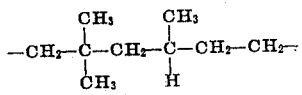

and

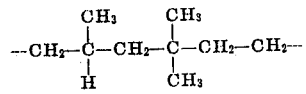

(b) $-(CH_2)_m-$ (c) 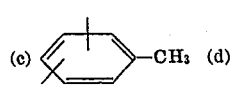 (d) 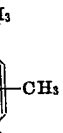 (e) 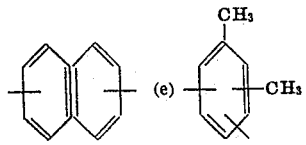

and mixtures in any proportions thereof,
n is a number between four and 11,
m is a number between two and 11,
between 50 and 100 mol % of the radical
R being selected from the group consisting of the mixture in any proportions of the two isomers

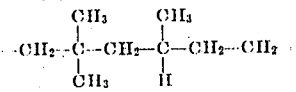

and

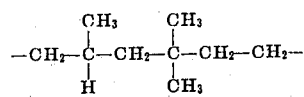

said copolyamides having a relative solution viscosity (as measured on a solution of 1 g of polymer in 100 ml of 96 % $H_2SO_4$ at 25° C) in the range of from 1,6 to 2,6. Copolyamides of this kind are completely dimensionally stable and undergo hardly any stressing during shrinkage at a temperature below 40° C, while the stressing on shrinkage of conventional copolyamides at this temperature is as high as from 0.5 to 0.88 kp/mm². At the same time, the shrinkage capacity of the copolyamides according to the invention at 75° C is from 7 to 8 times greater than that of conventional polyamides and copolyamides. As a result, it is possible to wrap temperature-sensitive products with extreme care in shrink film and, at the same time, to obtain a considerably higher throughput heretofore, using conventional shrink-packing machinery, such as shrinkage tunnels, because the amount of energy expended per shrink pack can be considerably reduced. Furthermore, the product to be packed can be held very firmly in place as required, by virtue of the high shrinkage capacity of the packaging film coupled with its favorable shrinkage stressing.

Since the copolyamides according to the invention are insoluble in methanol, they may readily be used as a packaging material for methanol-containing feedstock or as a substrate for forming laminates from plastics materials dissolved in methanol, unlike other copolyamides, for example those polycondensed from amino-undecanoic acid according to DAS 1,265,412.

The copolyamides according to the invention are obtained by a process for the production of a shrinkable film forming transparent copolyamide which comprises copoly-condensing 65–85 percent by weight of ω-amino undecanoic acid and 35–15 percent by weight of a salt of a dicarboxylic acid selected from the group consisting of terephthalic acid, isophthalic acid, and an acid of the general formula $$\mathrm{HOOC-(CH_2)_n-COOH}$$

wherein n is a number between four and 11, with a diamine of the general formula $$\mathrm{H_2N - R - NH_2}$$

wherein R is
a. a mixture in any proportions of the two isomers

and

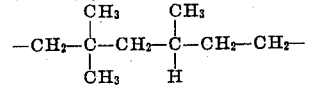

(b)  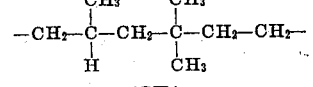

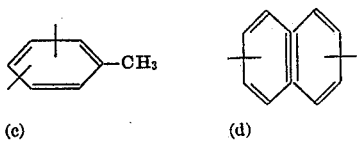

or a mixture in any proportions of these radicals, wherein m is a number between two and eleven, and wherein between 50 and 100 mol percent of said diamine consists of the mixture in any proportions of the two isomers

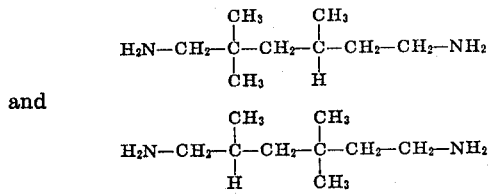

and

The process is carried out in known manner at temperatures from 200° to 320° C, preferably from 270° to 290° C.

It is also of advantage to add acetic acid and phosphoric acid to the aforementioned mixture of starting monomers, because it is possible in this way not only to promote polycondensation but also to homogenize the chain lengths of the macromolecules.

Measurements carried out on filaments of the copolyamides according to the invention stretched under heat in order to determine the degree of stressing to which they are subjected during shrinkage, have surprisingly shown that the filaments undergoes hardly any stressing on shrinkage at temperatures down to freezing point, while the extent to which they are stressed during shrinkage actually reaches a maximum at 85° C. By contrast, the conventional nylon 11, tested under the same conditions, underwent considerable stressing at temperatures of only 20° C, the stressing increasing almost linearly with increasing temperature, up to a maximum at 90° C.

Shrinkage of the copolyamides according to the invention only begins at 50° C, rising sharply to a maximum at 85° C. By contrast, the shrinkage of nylon 11, as a comparison material, increases only slowly with increasing temperature.

The production and properties of the copolyamides according to the invention are illustrated in, but are by no means limited by, the following Examples and a Table in which the results of comparative measurements on commercial polyamides are also set out.

EXAMPLE 1

Two-thousand g of amino-undecanoic acid and 500 g of the salt of terephthalic acid and a 25.0–75.0 mol percent mixture of the isomers 2,2,4- and 2,4,4-trimethylhexamethylenediamine are heated to 250° C in an autoclave in the presence of 2.96 ml of 2-normal acetic acid and 0.3 ml of 3-normal phosphoric acid. Before heating, the contents of the autoclave are covered with oxygen-free nitrogen. The excess gas pressure which builds up is vented and the reaction components are polycondensed for 5 hours at 280° to 290° C. The product formed, is extruded under nitrogen pressure through a nozzle to form a filament which is granulated. The product is highly transparent, glossy and insoluble in methanol. It is impossible over a period of 5 hours to extract any monomeric components from the polymers by means of methanol and/or water. The melting range if from 154° to 160° C, and the relative viscosity is 2.25 (as measured in the form os a solution of 1 g in 100 ml of 96 percent by weight sulphuric acid).

The granulate can be blown in known manner into a tubular film by means of an extruder.

EXAMPLE 2

One thousand twenty g of amino-undecanoic acid and 695 g of the salt of terephthalic acid and a 50–50 mole percent mixture of the isomers 2,2,4- and 2,4,4-trimethylhexamethylenediamine are poly-condensed in an autoclave in the presence of 2.96 ml of 2-normal acetic acid and 0.3 ml of 3-normal phosphoric acid as described in Example 1. It is impossible over a period of 5 hours to extract any monomeric or polymeric components from the polycondensation products by means of methanol and/or water. The melting range of the polycondensate according to the invention is from 143° to 150° C and its relative viscosity is 1.97 (as measured in the form of a solution of 1 g of 100 ml of 96 percent by weight sulphuric acid).

The granulate can be blown in known manner into a tubular film by means of an extruder.

EXAMPLE 3

To a suspension consisting of 1000 ml of water and 193.3 g of terephthalic acid are added 208.7 g of a 75.0-25.0 mol percent mixture of the isomers 2,2,4- and 2,4,4-trimethylhexamethylene-diamine. The suspension is heated and stirred until a clear solution is obtained. Then 1600 g (80 percent by weight) of aminoundecanoic acid, 53,5 ml of 2-normal acetic acid, and 1 ml of 3-normal phosphoric acid are added. Before heating, the content of the autoclave is covered with oxygen-free nitrogen. The reaction mixture is kept at a temperature of 200°–210° C for one hour and the excess gas pressure which builds up is vented within one further hour, and then the reaction components are polycondensed for 6 hours at 280° – 290° C, while a slow stream of oxygen-free nitrogen is passing through the autoclave. The product formed is extruded under nitrogen pressure through a nozzle to form a filament which is granulated. Within 5 hours, 0,5 percent monomeric components are extracted by water. The melting range is from 145° to 153° C, and the relative viscosity is 1,74.

The granulate can be blown in known manner into a tubular film by means of an extruder.

The shrinkage characteristics of the copolyamides according to the invention obtained in accordance with Examples 1,2 and 3 and the corresponding data of commercial polyamides are set out in the following Table.

TABLE

| Product | stressing on shrinkage at 40° C (kp/mm²) | stressing on shrinkage at 75° C (kp/mm²) | shrinkage (%) at 40° C | shrinkage (%) at 75° C |
| --- | --- | --- | --- | --- |
| Nylon –6 | 0.1 | 1.96 | 0 | 3.5 |
| Nylon –11 | 0.88 | 2.34 | 0 | 8.0 |
| Nylon –12 | 0.52 | 1.90 | 0 | 6.0 |
| Copolyamide according to Example 1 | 0 | 2.42 | 0 | 59.0 |
| Copolyamide according to Example 2 | 0 | 1.90 | 0 | 65.0 |
| Copolyamide according to Example 3 | 0 | 1.86 | 0 | 67.0 |

The stressing and shrinkage date given in the Table clearly demonstrate the distinct superiority of the copolyamides according to the invention to the commercial comparison products. They exhibit an extremely high shrinkage capacity at comparatively low temperatures without any deterioration in their dimensional stability up to a temperature of 40° C; while conventional polyamides show a shrinkage of 75° C which is from 8 to 20 times less than that of the products according to the invention.

The unexpected technological advantages of the products according to the invention are manifested, above all, in the limited amount of energy required to initiate shrinkage, in the nondamaging shrink packaging of temperature-sensitive products, in the higher throughput rate attributable to the smaller amount of energy required to the initiate shrinkage, and finally in the improvement in both the forming and welding properties attributable to the melting temperature which is reduced by some 50° to 80° C. AT the same time, the copolyamides according to the invention are glass-clear in appearance and are insoluble in methanol, so that they are also eminently suitable for use in the packaging of methanol-containing feedstock, or as substrate films for the production of laminates by coating with solutions of plastics materials dissolved in methanol.

What we claim is:

1. A shrinkable film-forming transparent copolyamide consisting essentially of 65–85 percent by weight of recurring structural units of the formula $-\!\!+\!\mathrm{NH}-(\mathrm{CH}_2)_{10}-\mathrm{CO}\!+\!-$ and 35–15 percent by weight of recurring structural units of the general formula $+\mathrm{OC}-\mathrm{Y}-\mathrm{CO}-\mathrm{NH}-\mathrm{R}-\mathrm{NH}+$ wherein Y is

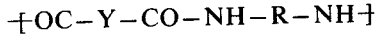

or $-(\mathrm{CH}_2)_n-$ and
R is a member selected from the group consisting of
a) a mixture in any proportions of the two isomers

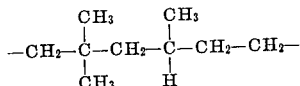

and

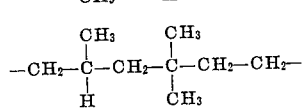

(b) 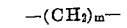

(c)

(d) 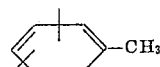

(e) 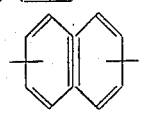

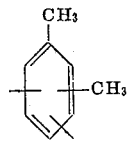

and mixtures in any proportions thereof,
n is a number between four and 11,
m is a number between two and 11,
between 50 and 100 mol percent of the radical,
R being selected from the group consisting of the mixture in any proportions of the two isomers

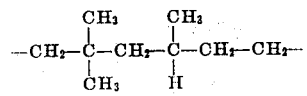

and

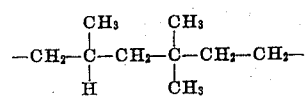

said copolyamides having a relative solution viscosity (as measured on a solution of 1 g of polymer in 100 ml of 96 % percent $H_2SO_4$ at 25° C)) in the range of from 1,6 to 2,6.

2. A process for the production of a shrinkable film-forming transparent copolyamide which comprises copolycondensing 65–85 percent by weight of ω-amino undecanoic acid and 35–15 percent by weight of a salt of a dicarboxylic acid selected from the group consisting of terephthalic acid, isophthalic acid, and an acid of the general formula $HOOC-(CH_2)_n-COOH$ wherein n is a number between four and 11, with a diamine of the general formula $H_2N-R-NH_2$ wherein R is
a. a mixture in any proportions of the two isomers

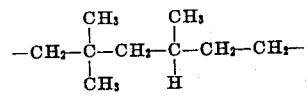

and

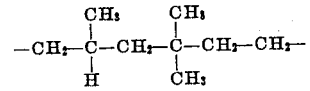

(b) 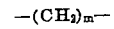

(c)

(d) 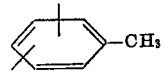

(e) 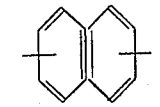

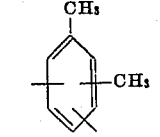

or a mixture in any proportions of these radicals, wherein m is a number between two and 11 and wherein between 50 and 100 mol percent of said diamine consists of the mixture in any proportion of the two isomers and
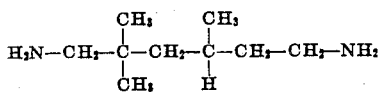
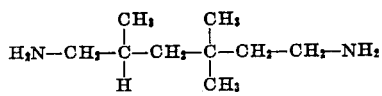
said process being carried out at temperatures from 200° to 320° C.
3. A shrinkable film consisting of a copolyamide according to claim 1.
4. The copolyamide of claim 1 wherein R is a).
5. The process of claim 2 wherein R is a).
6. A shrinkable film consisting of a polyamide according to claim 4.
* * * * *

UNITED STATES PATENT OFFICE
CERTIFICATE OF CORRECTION

Patent No. 3,692,748 (SN 88,123)   Dated September 19, 1972

Inventor(s) HELMUT HUHN and LUTZ HOPPE

It is certified that error appears in the above-identified patent and that said Letters Patent are hereby corrected as shown below:

Page 1, after item "[21]" insert the following

--[63]   Related U.S. Application Data

Continuation-in-part of Ser. No. 823,939 filed May 12, 1969, abandoned.--

Col. 3, line 69 (last line), "if" should be ---is---.

Col. 4, line 8, "twenty" should be ---six hundred twenty---.

Col. 5, line 1, "date" should be ---data---.

Signed and sealed this 7th day of January 1975.

(SEAL)
Attest:

McCOY M. GIBSON JR.
Attesting Officer

C. MARSHALL DANN
Commissioner of Patents